Patented Mar. 1, 1932

1,847,799

UNITED STATES PATENT OFFICE

LOUIS WEIL, OF STRASBOURG, FRANCE

FOOD LEAVENING COMPOSITION

No Drawing. Application filed December 21, 1928, Serial No. 327,743, and in Germany December 31, 1927.

My invention relates to improvements in a process for the production of lasting, storable carbon-dioxide developing powder for food and delicacies, as for example baking powder. Most of the carbon-dioxide developing powders of food and delicacies, as for example baking powder, which are used in the produce industry and in the kitchen, contain an acid constituent and a carbon-dioxious salt and besides also vegetable meal of starch meal as a filler or a diluent. This filler often amounts up to one half of the weight of the baking powder. The carbonates or bicarbonates employed nearly always contain a fair amount of moisture and the said filler seldom less than fifteen per cent water. Hardly anything else than calcium biphosphate ($CaHPO_4 + 2H_2O$) came into consideration as a filler of a mineral nature and this also still contains about twenty one per cent water.

Under these circumstances it will be understood that according to the more or less high moisture contents, during storage and keeping of these powder mixtures the acid part sooner or later decomposes a part of the carbonate and so reduces the available amount of carbon-dioxide which could be expected in use, for example for the preparation of dough. It is known that the leavening power of nearly all known baking powders becomes less and less during storage and that many among them posses no leavening power at all after a certain time.

The present invention consists in a process to reduce the moisture contents of such powders, as baking powder, to a minimum or to zero, and if possible to also make non-injurious moisture which accidentally enters during storage.

The essence of the present invention consists in the incorporation in the baking or other carbon-dioxide developing powder serving nutritive or pleasure purposes, whatever composition they may be, of a greater or smaller quantity (of 1 to 90%), mostly between 20 and 40%, of a neutral calcium earth alkali-pyrophosphate, for example neutral calcium pyrophosphate. This earth-alkali, for example calcium pyrophosphate, in the main should enter into the composition of such powders as an absolutely dry and even also water-binding filler.

The calcium phosphate ($CaHPO_4 + 2H_2O$) slowly loses its water when it is dried at one hundred degrees and at one hundred and fifty degrees gives up the last remains of its approximately 21% water. At red heat it is then coverted into calcium pyrophosphate ($Ca_2P_2O_7$) and a further 6.62% of water, which was chemically combined, escapes:

$2CaHPO_4 = Ca_2P_2O_7 + H_2O$.

Acid calcium pyrophosphate and its use does not constitute the invention, because this acts as a direct leavening means, whilst neutral calcium pyrophosphate (in additions of 1 to 60% to the single constituents of the baking powder or to the finished mixture of the leavening means) acts solely as a stabilizing filling and diluting substance.

Acid pyrophosphates, namely the water soluble acid sodium pyrophosphate, are used as the acid constituent in the production of baking powder. The invention consists neither in the process of production for pyrophosphates, nor the use of acid or soluble alkali pyrophosphates as carbon dioxide developer from the carbonates. What solely comes into consideration as new is the incorporation of neutral earth alkalies, for example calcium pyrophosphate as a water-free and eventually water-binding hygienic unobjectionable filling substance. The invention rests on experiments over a length of years which showed the inventor that those baking powders with which the said filler was incorporated attained thereby a practically unlimited durability and storability, not only because this filler contains no water whatever, be it chemically combined or crystal water or be it moisture, but because it can also chemically bind water which comes to it and thereby first change itself back into water-free and later eventually into ordinary calcium biphosphate.

All other earth alkali pyrophosphates, in particular magnesium pyrophosphate has shown itself to be usable.

Having thus described and ascertained the nature of my said invention I declare that what I claim is:

1. A composition of matter in dry form comprising an acidic substance, a substance capable of reacting with said acidic substance in aqueous solution to liberate carbon dioxide gas, and a filler consisting of a neutral earth alkali pyrophosphate.

2. A composition of matter in dry form comprising an acidic substance, a substance capable of reacting with said acidic substance in aqueous solution to liberate carbon dioxide gas, and a filler consisting of neutral calcium pyrophosphate.

3. A composition of matter in dry form comprising an acidic substance, a substance capable of reacting with said acidic substance in aqueous solution to liberate carbon dioxide gas, and a filler consisting of neutral magnesium pyrophosphate.

In witness whereof I affix my signature.

LOUIS WEIL.